US009712045B2

(12) United States Patent
Mao et al.

(10) Patent No.: US 9,712,045 B2
(45) Date of Patent: Jul. 18, 2017

(54) SYSTEM AND METHOD FOR A STARTUP CELL CIRCUIT

(71) Applicant: Infineon Technologies Austria AG, Villach (AT)

(72) Inventors: Mingping Mao, Singapore (SG); Junyang Luo, Singapore (SG); Guoxing Zhang, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 68 days.

(21) Appl. No.: 14/933,428

(22) Filed: Nov. 5, 2015

(65) Prior Publication Data

US 2016/0141951 A1     May 19, 2016

Related U.S. Application Data

(60) Provisional application No. 62/080,689, filed on Nov. 17, 2014.

(51) Int. Cl.
    *H02M 1/36*       (2007.01)
    *H02M 1/42*       (2007.01)
    *H02M 3/337*      (2006.01)
    *H02M 1/00*       (2006.01)

(52) U.S. Cl.
CPC ........... *H02M 1/36* (2013.01); *H02M 1/4225* (2013.01); *H02M 3/337* (2013.01); *H02M 2001/007* (2013.01); *H02M 2001/008* (2013.01); *H02M 2001/0032* (2013.01); *H02M 2001/0058* (2013.01); *Y02B 70/126* (2013.01); *Y02B 70/1433* (2013.01); *Y02B 70/1491* (2013.01); *Y02B 70/16* (2013.01)

(58) Field of Classification Search
CPC ............................. H02M 1/36; H02M 1/4225
USPC .......................... 363/21.02, 21.08, 21.16, 49
See application file for complete search history.

(56) References Cited

U.S. PATENT DOCUMENTS

| 5,812,383 | A | * | 9/1998 | Majid | ............... | H02M 3/33523 |
| | | | | | | 363/19 |
| 8,045,348 | B2 | * | 10/2011 | Zhu | ........................ | H02M 1/36 |
| | | | | | | 363/18 |
| 8,300,429 | B2 | | 10/2012 | Orr et al. | | |
| 2005/0052886 | A1 | * | 3/2005 | Yang | ........................ | H02M 1/36 |
| | | | | | | 363/49 |
| 2007/0058398 | A1 | * | 3/2007 | Yang | ....................... | H02M 1/36 |
| | | | | | | 363/16 |

(Continued)

FOREIGN PATENT DOCUMENTS

| JP | 2003018825 A | 1/2003 |
| JP | 2012191741 A | 10/2012 |

*Primary Examiner* — Jeffrey Sterrett
(74) *Attorney, Agent, or Firm* — Slater Matsil, LLP

(57) ABSTRACT

According to an embodiment, a circuit comprising includes a first switching circuit coupled to a power supply input, a second switching circuit coupled to an output of the first switching circuit, a supply capacitor coupled to the second switching circuit, and a startup cell coupled to the power supply input and the supply capacitor. The startup cell is configured to electrically couple the power supply input to the supply capacitor when the second switching circuit is not actively switching. The startup cell is also configured to electrically decouple the power supply input from the supply capacitor when the second switching circuit is actively switching.

18 Claims, 13 Drawing Sheets

(56) References Cited

U.S. PATENT DOCUMENTS

| | | | | |
|---|---|---|---|---|
| 2007/0247879 A1* | 10/2007 | Yang | ........................ | H02M 1/36 363/49 |
| 2011/0222313 A1* | 9/2011 | Ueno | ................ | H02M 3/33507 363/15 |
| 2011/0222319 A1* | 9/2011 | Marumo | ........... | H02M 3/33507 363/21.12 |
| 2012/0195075 A1* | 8/2012 | Nate | ................. | H02M 3/33553 363/21.01 |
| 2012/0230069 A1* | 9/2012 | Tzeng | .............. | H02M 3/33507 363/49 |
| 2013/0051088 A1* | 2/2013 | Yamashita | ............. | H02M 1/36 363/21.13 |
| 2013/0343101 A1* | 12/2013 | Zhang | ............. | H02M 3/33523 363/21.18 |
| 2014/0167640 A1* | 6/2014 | Knoedgen | ............ | H02M 3/158 315/239 |
| 2015/0003118 A1* | 1/2015 | Shin | .................. | H02M 3/33507 363/21.12 |
| 2015/0023072 A1* | 1/2015 | Al-Shyoukh | ........... | H02M 1/36 363/49 |
| 2015/0194875 A1* | 7/2015 | Jutras | ....................... | H02M 1/36 363/49 |
| 2016/0087524 A1* | 3/2016 | Simi | .................. | H05B 33/0887 323/205 |
| 2016/0111962 A1* | 4/2016 | Mao | ................. | H02M 3/33507 363/21.16 |
| 2016/0141951 A1* | 5/2016 | Mao | ........................ | H02M 1/36 363/21.02 |
| 2016/0149504 A1* | 5/2016 | Quigley | ................. | H02M 1/36 363/21.04 |
| 2016/0352231 A1* | 12/2016 | Quigley | ............ | H02M 3/33507 |
| 2016/0359419 A1* | 12/2016 | Lin et al. | ........... | H02M 3/33515 |
| 2017/0054376 A1* | 2/2017 | Quigley | ................. | H02M 1/36 |

\* cited by examiner

SYSTEM AND METHOD FOR A STARTUP
CELL CIRCUIT

This application claims the benefit of U.S. Provisional Application No. 62/080,689, entitled "System and Method for a Switched-Mode Power Supply," filed on Nov. 17, 2014, which application is hereby incorporated herein by reference.

TECHNICAL FIELD

The present invention relates generally to switching circuits, and, in particular embodiments, to a system and method for a startup cell circuit.

BACKGROUND

Power supply systems are pervasive in many electronic applications from computers to automobiles. Generally, voltages within a power supply system are generated by performing a DC-DC, DC-AC, and/or AC-DC conversion by operating a switch loaded with an inductor or transformer. One class of such systems includes switched mode power supplies (SMPS). An SMPS is usually more efficient than other types of power conversion systems because power conversion is performed by controlled charging and discharging of the inductor or transformer and reduces energy lost due to power dissipation across resistive voltage drops.

An SMPS usually includes at least one switch and an inductor or transformer. Some specific topologies include buck converters, boost converters, and flyback converters, among others. A control circuit is commonly used to open and close the switch to charge and discharge the inductor. In some applications, the current supplied to the load and/or the voltage supplied to the load is controlled via a feedback loop.

One application of an SMPS is as a power supply for a light emitting diode (LED), such as those used in residential and commercial lighting applications to replace incandescent light bulbs and compact florescent lamps (CFL). In some applications, a SMPS is used to convert an AC line voltage to a DC current in order to power the LED.

SUMMARY

According to an embodiment, a circuit comprising includes a first switching circuit coupled to a power supply input, a second switching circuit coupled to an output of the first switching circuit, a supply capacitor coupled to the second switching circuit, and a startup cell coupled to the power supply input and the supply capacitor. The startup cell is configured to electrically couple the power supply input to the supply capacitor when the second switching circuit is not actively switching. The startup cell is also configured to electrically decouple the power supply input from the supply capacitor when the second switching circuit is actively switching.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Description is made with respect to various embodiments in a specific context, namely switching circuits, and more particularly, switching circuits for AC/DC converters. Some of the various embodiments described herein include power factor correction (PFC), LLC resonant converters, and PFC converters coupled to LLC resonant converters for AC/DC power conversion. In other embodiments, aspects may also be applied to other applications involving any type of switching circuit according to any fashion as known in the art.

In an embodiment, a first switching stage and a second switching stage are coupled in series and a controller is coupled to the first and second switching stages in order to provide switching control signals to each stage. Power is supplied at a power supply input to the first switching stage in order to provide conversion, such as AC to DC conversion. In some embodiments, the controller is powered by an output of one of the switching stages. For example, the second switching stage supplies DC power to the controller. During some operation modes or phases, such as at startup or during standby phases, the second switching stage may be deactivated and it is possible for power supplied to the controller to be interrupted. In order to prevent power interruption, a supply capacitor is coupled to the controller and charged by the power supply input during startup or standby phases. In particular, the supply capacitor is coupled to the power supply input as long as the second switching stage is inactive, during startup or standby phases. In some specific embodiments, even when the first switching stage is active, if the second switching stage remains inactive, the power supply input is coupled to the supply capacitor in order to charge the supply capacitor, which supplies the controller.

In various embodiments described herein, maintaining a charge on the supply capacitor when the second switching stage is inactive prevents low supply voltages from causing the controller to reset during operation and also prevents switching drive voltages from dropping below minimum voltage thresholds for driving switching.

Figure 1:
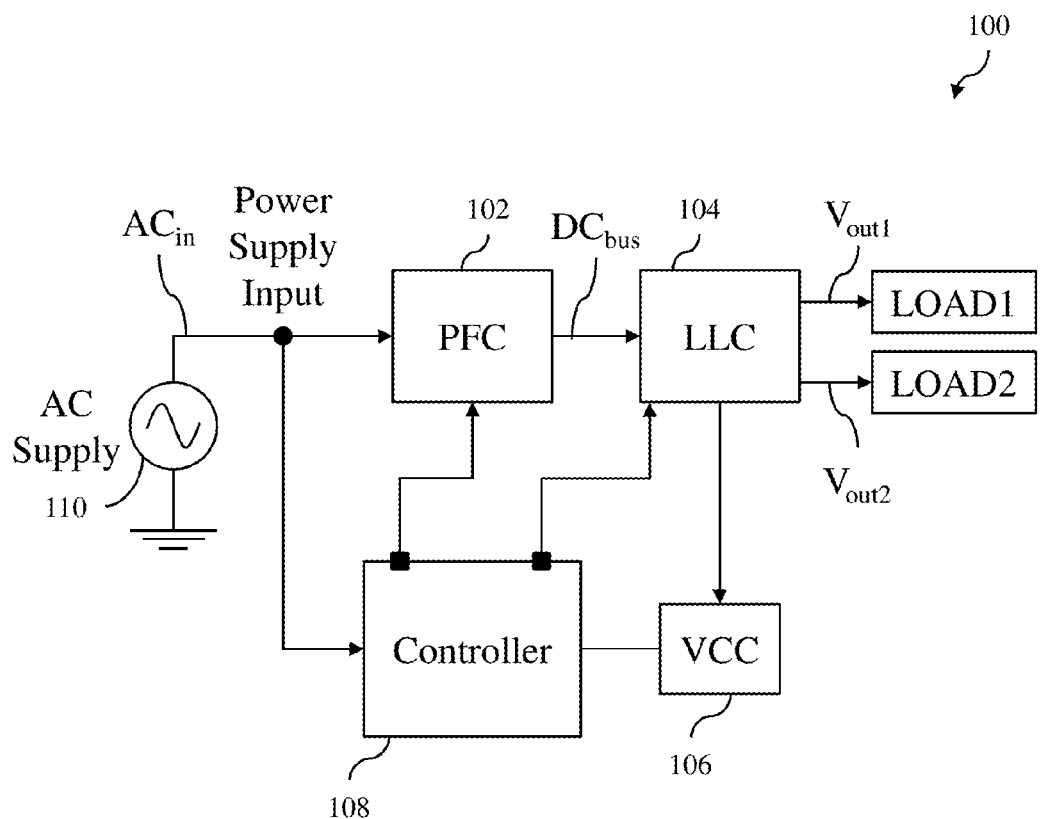
FIG. 1 illustrates an exemplary switched-mode power supply (SMPS) system that may be used to provide power to an electronic system.

FIG. 1 illustrates an exemplary switched-mode power supply (SMPS) system 100 that may be used to provide power to an electronic system, such as a flat screen monitor or television set. As shown, switched-mode power supply system 100 includes two stages: power factor correction (PFC) stage 102 followed by a resonant mode switched-mode power supply such as inductor-inductor-capacitor (LLC) power supply converter 104. PFC stage 102 is configured to convert an AC line voltage $AC_{in}$ into a DC bus voltage $DC_{bus}$, while LLC power supply converter 104 is configured to convert the DC bus voltage output of PFC stage 102 to one or more DC power outputs, e.g., $V_{out1}$ and $V_{out2}$, for SMPS system 100, as represented by output voltages $V_{out1}$ and $V_{out2}$. As shown, LLC power supply converter 104 includes two outputs coupled to loads represented as LOAD1 and LOAD2. In a system such as a flat screen television set, LOAD1 may represent audio circuitry, while LOAD2 may represent a power supply output coupled to backlight circuitry.

As shown, LLC power supply converter 104 also provides power to VCC supply circuit 106 for controller 108. Controller 108 provides switching control signals for PFC stage 102 and LLC power supply converter 104 and is powered by a converted signal from LLC power supply converter 104. VCC supply circuit 106 is configured to maintain the power supply to controller 108, even when LLC power supply converter 104 is inactive and not supplying controller 108. In various embodiments, the unconverted power supply input $AC_{in}$ from AC supply 110 is coupled through a startup cell (inside controller 108) to VCC supply circuit 106 when LLC power supply converter 104 is inactive in order to charge a supply capacitor in VCC supply circuit 106 to maintain power supplied to controller 108. A rectifier (not shown) may also be included between AC supply 110 and the startup cell in order to supply rectified power to VCC supply circuit 106.

In one embodiment, for example, a power supply system used to provide power to a medium to large size LED television set, LLC power supply converter 104 may be configured to provide multiple voltage outputs to supply the audio circuitry, LED drivers, and LED backlighting. In addition, a lower voltage, such as 3.5 V for example, may be used to supply a processor, such as a microcontroller, in the main board of the television set.

Figure 2:
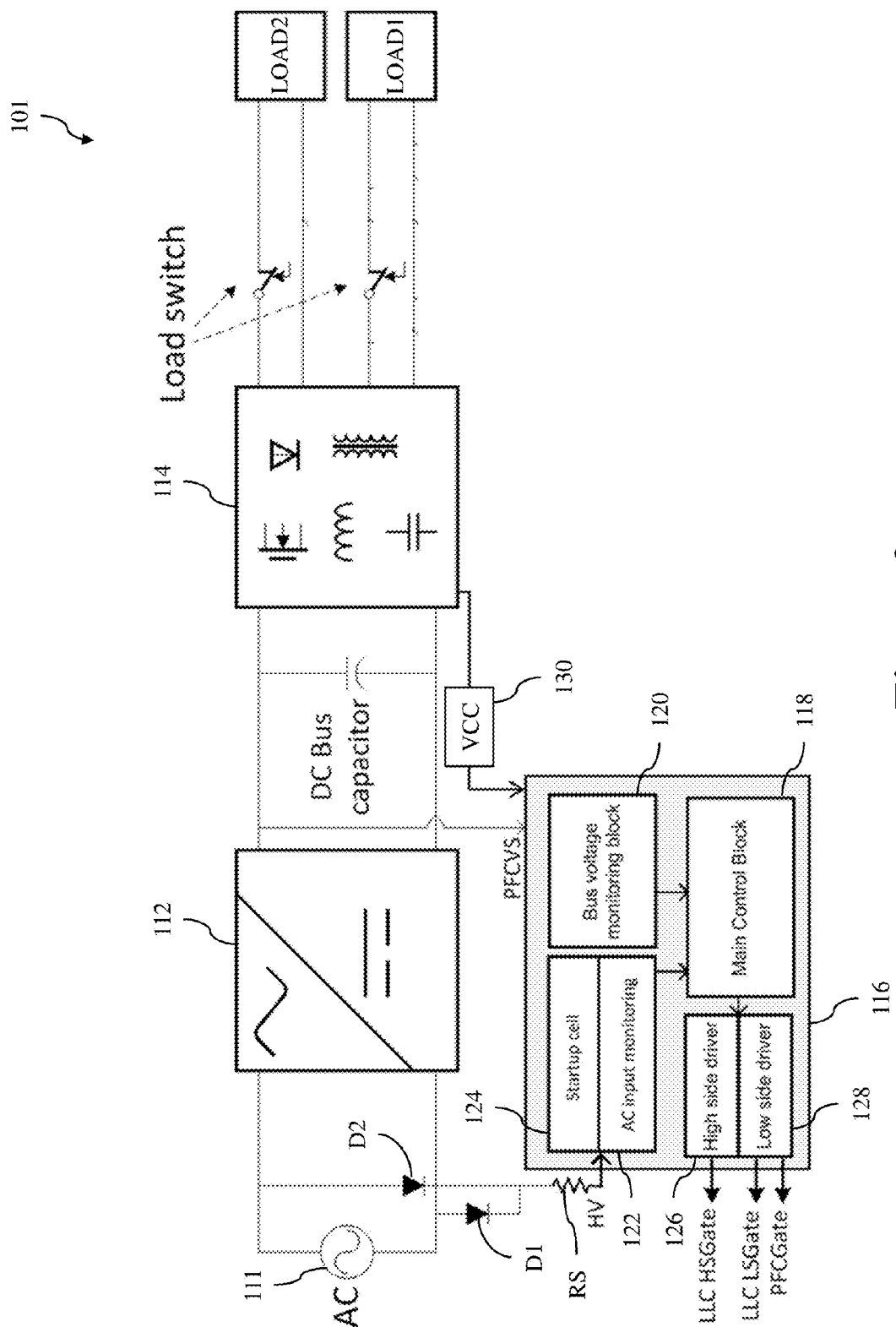
FIG. 2 illustrates an SMPS system according to an embodiment.

FIG. 2 illustrates an SMPS system according to an embodiment of the present invention. As shown, the embodiment SMPS system 101 includes PFC converter 112 followed by LLC converter 114. In one particular alternative embodiment, LLC converter 114 may be implemented using another type of resonant power converter circuit such as a series resonant power converter. In further embodiments, LLC converter 114 may be replaced by other PWM converter topologies that include but are not limited to flyback converters and forward converters. LLC converter 114 may also be implemented by a derivate topology of the PWM converters that include active clamping, for example, but are not limited to an active clamping flyback converter and an active clamping forward converter. In such converters, an additional switching element actively clamps the voltage overshoot across the switching transistor (e.g., a MOSFET) of the original flyback or forward converter. Accordingly, a higher efficiency may be achieved than in a flyback or forward converter that uses passive components, such as a resistor, a capacitor or a diode to clamp voltage overshoot across the switching transistor. In further embodiments, PFC converter 112 may be implemented using an AC/DC converter that does not provide power factor correction.

In the illustrated example, LLC converter 114 has two power supply output ports coupled to loads represented by block LOAD1 and block LOAD2. It should be understood that in alternative embodiments, LLC converter 114 may have more than two power supply output ports or may have only a single output port.

In an embodiment, controller IC 116 provides the gate control signals for PFC converter 112 and LLC converter 114. For example, signals LLC HSGate and LLC LSGate drive high-side and load-side switches of LLC converter 114, respectively, and signal PFCGate drives a switch in PFC converter 112. In an embodiment, these gate control signals (LLC HSGate, LLC LSGate, and PFCGate) are generated by high side driver 126 and low side driver 128 disposed on controller IC 116. Alternatively, external driver circuits may be used. During normal operating modes, main control block 118 of controller IC 116 implements SMPS algorithms for PFC converter 112 and LLC converter 114. Main control block 118 of controller IC 116 may be implemented, for example, using analog circuitry, digital circuitry, or a combination thereof. In various embodiments, various power supply control circuits, methods, and algorithms known in the art may be used. For example, for PFC converter 112, main control block 118 may generate a pulse width modulated (PWM) signal for the PFCGate signal based on an output voltage of PFC converter 112 measured by bus monitoring voltage block 120, and may generate a frequency modulated signal for the LLC HSGate and LLC LSGate signals based on an output voltage of LLC converter 114 measured by a feedback block coupled to the output (not shown). Signals PFCGate, LLC HSGate, and LLC LSGate may be generated, for example, using a pulse generator in main control block 118.

In some embodiments, controller IC 116 further includes AC Input voltage monitoring circuit 122 and startup cell 124 used to power controller IC 116 during startup. In one embodiment, startup cell 124 includes a semiconductor switch that couples a rectified AC input voltage to a local low voltage power supply of controller IC 116, which is implemented by VCC supply circuit 130 shown coupled between controller IC 116 and LLC converter 114. As shown, the AC input voltage from AC supply 111 is rectified using two diodes D1 and D2 coupled between the input terminal of PFC converter 112 and high voltage input pin HV of controller IC 116. A series resistor RS may be included to limit current to high voltage input pin HV.

In an embodiment, startup cell 124 includes a depletion metal-oxide-semiconductor field effect transistor (MOSFET). Startup cell 124 supplies the rectified input power to VCC supply circuit 130. In various embodiments, VCC supply circuit 130 includes a supply capacitor that is charged by the rectified input power whenever startup cell 124 is conducting. In various embodiments, startup cell 124 is controlled to supply the input power signal to VCC supply circuit 130 during startup and also during standby modes when LLC converter 114 is temporarily deactivated. Because LLC converter 114 supplies power to controller IC 116 during normal switching operation, if LLC converter 114 is deactivated, controller IC 116 may experience a lapse in power supply and reset. In particular embodiments, VCC supply circuit 130 is charged through startup cell 124 whenever LLC converter 114 is deactivated during a startup sequence or during standby phases. In specific embodiments, PFC converter 112 may be activated and switching, but as long as LLC converter 114 is deactivated, i.e., not actively switching, startup cell 124 may supply rectified input power to VCC supply circuit 130. In an embodiment, if the voltage supplied from LLC converter 114 to controller IC 116 goes below a threshold, startup cell 124 may be activated to supply VCC supply circuit 130 with the rectified input power.

The activation threshold for startup cell 124 may be determined in some embodiments based on the minimum voltage necessary to prevent controller IC 116 from resetting or based on the minimum voltage necessary to drive switching signals in LLC converter 114 or PFC converter 112. For example, controller IC 116 may have an under voltage lockout UVLO that shuts controller IC 116 off and causes a reset to occur. In such embodiments, the threshold for activating startup cell 124 may be set above the under voltage lockout UVLO. As another example, LLC converter 114 may include a high side switch, driven by the signal LLC HSGate, where the drive circuit is powered by the VCC voltage via a bootstrap circuit. The drive circuit to drive the high side switch may have a minimum voltage for driving of switching and the threshold for activating startup cell 124 may be set above the minimum voltage for driving the switching of the high side switch. Further details are described below in reference to specific implementations illustrated in the other figures. The inventive principles described herein may be extended to apply to alternate systems. In some embodiments, SMPS system 101 is one specific embodiment implementation of SMPS system 100 as described hereinabove in reference to FIG. 1.

Figure 3:
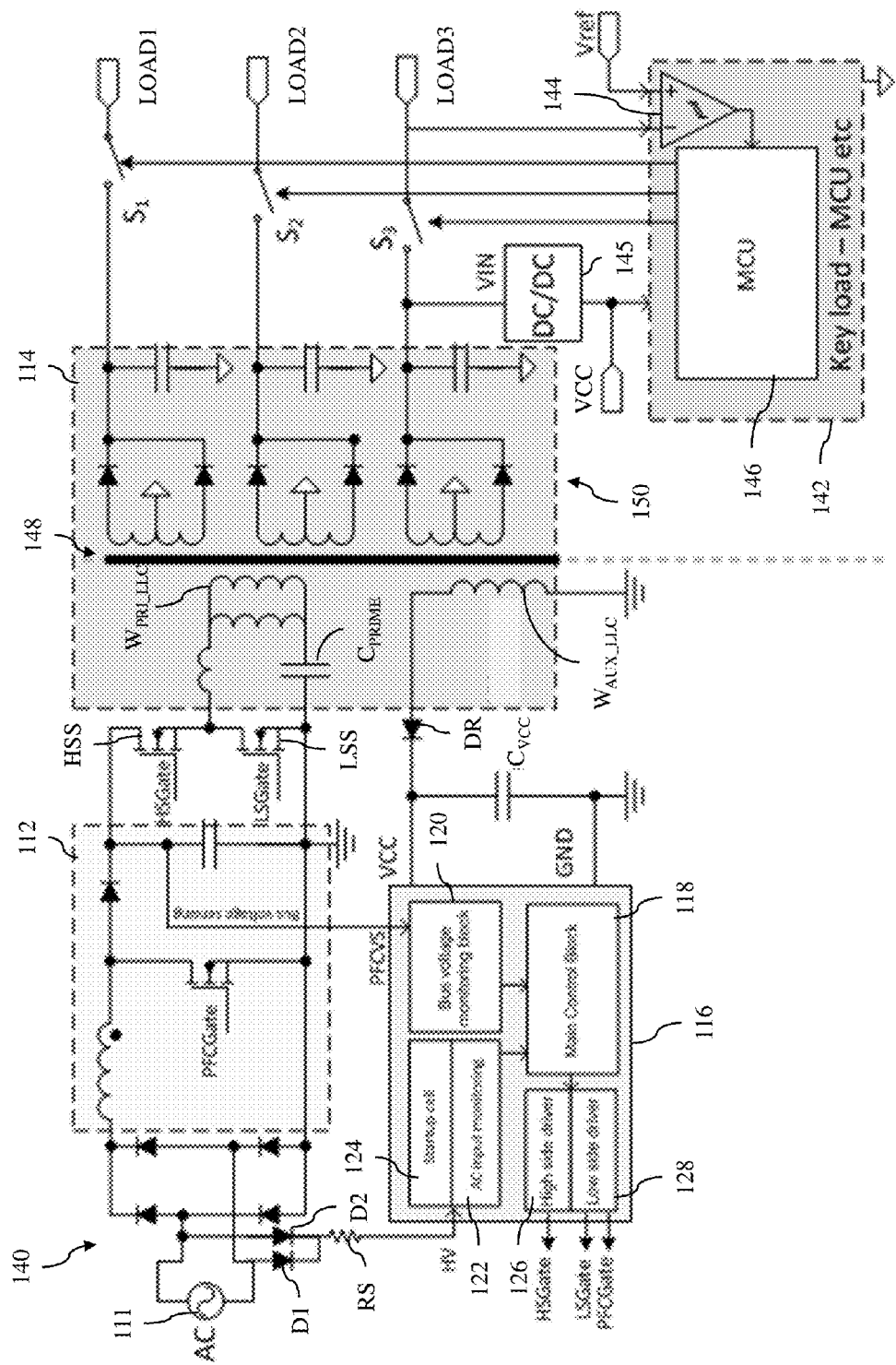
FIG. 3 illustrates an embodiment power supply system in which further details of the VCC supply circuit and the secondary side circuitry are shown.

FIG. 3 illustrates an embodiment power supply system 140 in which further details of VCC supply circuit 130 and the secondary side circuitry are shown, as well as the internal circuitry of PFC converter 112 and LLC converter 114. As shown, LLC converter 114 includes three outputs that are connected to load switches S1, S2, and S3 in order to provide power to ports LOAD1, LOAD2, and LOAD3, respectively. Key load block 142, which represents digital control circuitry of the target application, monitors the voltage of port LOAD3 by comparing this voltage to the reference voltage Vref via comparator 144. Alternatively, other voltage monitoring circuits may be used.

As shown, key load block 142 includes microcontroller (MCU) 146; however, key load block 142 may also include other circuitry. MCU 146 provides control signals that activate and deactivate load switches S1, S2, and S3 coupled between the outputs of LLC converter 114 and respective output ports LOAD1, LOAD2 and LOAD3. DC/DC converter 145 is coupled to key load block 142 and VCC voltage. As is further shown, LLC converter 114 includes transformer 148 with primary winding $W_{PRI\_LLC}$, auxiliary winding $W_{AUX\_LLC}$, and secondary winding circuits 150 (including secondary windings, diodes, and output capacitors). Auxiliary winding $W_{AUX\_LLC}$ is used to provide power for the supply voltage VCC of controller IC 116 via rectifying diode DR and VCC capacitor $C_{VCC}$, which implement VCC supply circuit 106 and VCC supply circuit 130 as described hereinabove in reference to FIGS. 1 and 2, respectively.

In an embodiment, startup cell 124 is activated when high-side switch HSS and low-side switch LSS of LLC converter 114 are not actively switching, such as during startup or standby phases as described hereinabove, in order to supply VCC capacitor $C_{VCC}$ with the rectified input power from AC supply 111. In other modes or phases, such as normal switching operation, when high-side switch HSS and low-side switch LSS of LLC converter 114 are actively switching, auxiliary winding $W_{AUX\_LLC}$ of LLC converter 114 provides the supply voltage VCC to controller IC 116 through rectifying diode DR and startup cell 124 may be disabled. In other applications where startup cell 124 may be disabled before high-side switch HSS and low-side switch LSS of LLC converter 114 begin switching, it is possible that the supply voltage VCC drops below minimum operating voltages causing a reset of controller IC 116 to occur or preventing switching in LLC converter 114, for example. In various embodiments, by controlling startup cell 124 to maintain the supply of input power to VCC capacitor $C_{VCC}$ until LLC converter 114 is actively switching, such reset or switch driving issues may be advantageously prevented. In such embodiments, the capacitance of VCC capacitor $C_{VCC}$ may be reduced.

Figure 4:
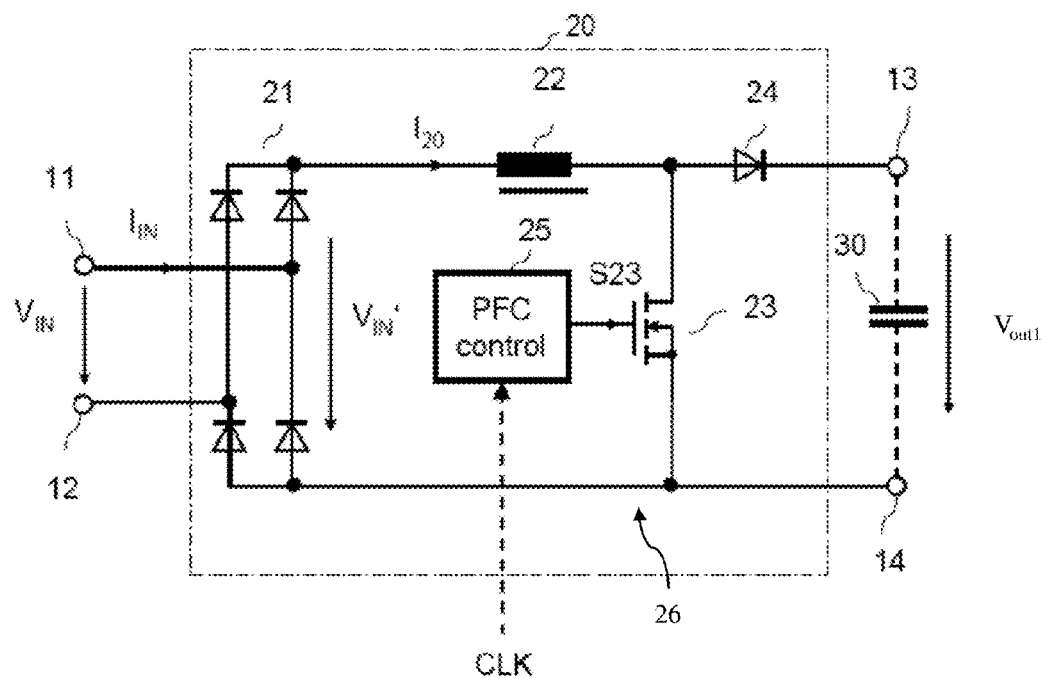
FIG. 4 illustrates a conventional PFC.

The general operation and configuration of a PFC converter and an LLC converter are typically known by those of skill in the art; however, these details are described briefly below in reference to FIGS. 4 and 5 in order to convey a complete understanding of embodiment systems and methods of operation. FIG. 4 illustrates a conventional PFC converter 20 that may be used to implement PFC stage 102 of PFC converter 112 as described hereinabove in reference to FIGS. 1, 2, and 3, for example. PFC converter 20 includes rectifier circuit 21, such as a bridge rectifier, connected to input terminals 11 and 12. Rectifier circuit 21 receives input voltage $V_{IN}$, such as the AC input signal shown in FIGS. 1, 2, and 3, at input terminals 11 and 12 and transforms input voltage $V_{IN}$ into a corresponding rectified input voltage $V_{IN}'$. When, for example, input voltage $V_{IN}$ has a sinusoidal waveform, the rectified input voltage $V_{IN}'$ has a waveform corresponding to the absolute value of the sine waveform. PFC converter 20 further has boost converter stage 26 that receives the rectified input voltage $V_{IN}'$ and generates the first output voltage $V_{out1}$. Boost converter stage 26 includes a series circuit including inductor 22, such as a choke, and electronic switch 23. This series circuit is coupled to rectifier circuit 21 such that the rectified input voltage $V_{IN}'$ is available across the series circuit. Electronic switch 23 is, for example, a transistor, in particular a MOSFET, as illustrated in FIG. 4. However, the use of a MOSFET, specifically of an n-MOSFET, as electronic switch 23 is only an example. Any other switching component, such as a p-MOSFET, an IGBT (insulated gate bipolar transistor), a BJT (bipolar junction transistor), a JFET (junction field-effect transistor) or a GTO (Gate Turn-Off Thyristor) may be used as well. The same applies to other electronic switches that will be explained herein below.

PFC converter 20 further includes rectifier element 24 connected between a circuit node that is common to inductor 22 and electronic switch 23 and one (13) of output terminals 13 and 14. Rectifier element 24 may be implemented as a diode (as illustrated in FIG. 4). However, rectifier element 24 may also be implemented as a synchronous rectifier (SR) using switching components.

Electronic switch 23 may receive an on/off-modulated, e.g., a pulse-width modulated (PWM), drive signal S23 from PFC controller 25. PFC controller 25 may be a conventional PFC controller that generates the on/off-modulated drive signal (such as PWM drive signal S23 of FIG. 4) such that the power factor is close to 1, such as between 0.97 and 1, and such that an output voltage (such as the first output voltage $V_{out1}$ in FIG. 4) at least approximately matches a desired voltage, such as, for example, 400V. In other words, PFC controller 25 provides on/off-modulated drive signal S23 such that input current $I_{IN}$ of PFC converter 20 is in phase with input voltage Vin. The on/off-modulated drive signal S23 is, for example, generated with a frequency (fixed or variable) that is dependent on a clock signal CLK (illustrated in dashed lines in FIG. 4). Clock signal CLK may be an external clock signal generated by an external clock signal generator (not shown), or may be a clock signal generated in PFC controller 25. Such conventional PFC controllers are as such known so that no further explanations are required in this regard. In an embodiment, the PWM drive signal S23 may be supplied as the PFCGate signal from controller IC 116 shown in FIG. 2 or 3, for example.

Figure 5:
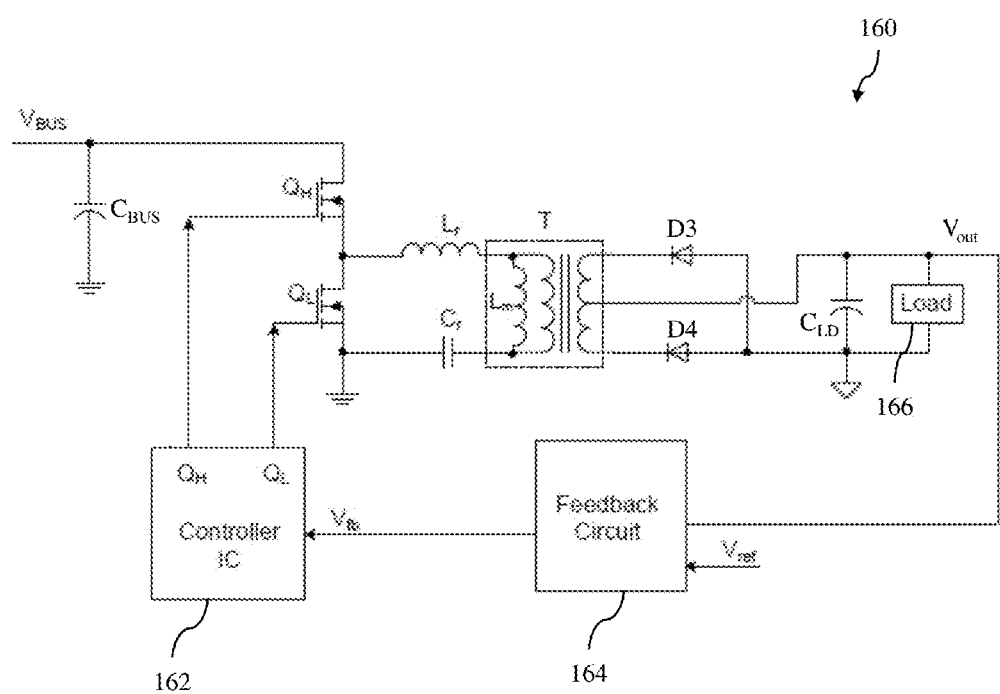
FIG. 5 illustrates a schematic drawing of an embodiment of a resonant half-bridge power converter.

FIG. 5 illustrates a schematic drawing of an embodiment of a resonant half-bridge power converter 160 that may be used to implement LLC power supply converter 104 or LLC converter 114 as described hereinabove in reference to FIGS. 1, 2, and 3, for example. This half-bridge topology is often referred to as an LLC power train circuit topology wherein a duty cycle of each primary-side power switch (high side transistor $Q_H$ and low side transistor $Q_L$) is set to about 50%, and the switching frequency $f_s$ is varied to control an output characteristic such as an output voltage. As switching frequency $f_s$ is varied, the effective gain of the switching converter changes as switching frequency $f_s$ changes in relation to the resonant frequency of the power converter. In practice, the duty cycle of each primary-side power switch (high side MOSFET $Q_H$ and low side MOSFET $Q_L$) is set to slightly less than 50% to avoid current shoot-through during switching transitions.

Resonant half-bridge power converter 160 is coupled to an input voltage source $V_{BUS}$ and includes controller IC 162 that regulates a power converter output characteristic such as an output voltage by regulating switching frequency $f_s$ of the power converter. Controller IC 162, together with feedback circuit 164, of the power converter senses output voltage $V_{out}$ of the power converter and desired output voltage $V_{ref}$ and controls switching frequency $f_s$ of the primary-side power switches to regulate the output voltage $V_{out}$ at the desired output voltage $V_{ref}$. Bus capacitor $C_{BUS}$ is coupled to input voltage source $V_{BUS}$ and high side MOSFET $Q_H$.

Resonant half-bridge power converter 160 provides power to a system or load 166 coupled to receive output voltage $V_{out}$. While in the illustrated embodiment the power train employs a half-bridge resonant power converter topology, those skilled in the art should understand that other converter topologies such as an isolated resonant full-bridge power converter topology and other PWM topologies, such as flyback and forward topologies are well within the broad scope of the present invention. Load capacitor $C_{LD}$ is coupled in parallel with load 166.

Resonant half-bridge power converter 160 further includes feedback circuit 164 that is employed to transmit a sensed output characteristic across the isolation boundary provided by power transformer T to controller IC 162. Various circuit devices, such as an opto-isolator, may provide this isolation function and are well known in the art and will not be described further herein in the interest of brevity.

In the primary side of the circuit, two series-coupled power switches, high-side MOSFET $Q_H$ and low side MOSFET $Q_L$, are coupled to two inductors, resonant inductor $L_r$ and primary winding $W_{PRI\_T}$ of the power transformer T, and to capacitor $C_r$. Inductance $L_m$ represents the magnetizing inductance of transformer T, and diodes D3 and D4 are secondary side rectifier diodes. In alternative embodiments, synchronous rectifier power switches may be employed in place of diodes D3 and D4.

The resonant frequency of the LLC power train circuit topology is $f_{RES}$. The resonant frequency $f_{RES}$ can be estimated from the equation $$f_{RES} = \frac{1}{2\pi \times \sqrt{L_r \times C_r}},$$

where $L_r$ and $C_r$ are the inductance and capacitance respectively of the indicated primary-side power train circuit elements illustrated in FIG. 5.

Half bridge LLC resonant switched mode power converters, such as resonant half-bridge power converter 160, are widely used due to their high conversion efficiency. Embodiment half bridge LLC resonant power converters may be configured to achieve zero voltage switching for primary side switches, and zero current switching for secondary side rectifiers under a wide input voltage range and under different load conditions. However, in embodiments that employed a frequency controlled gain, frequency $f_s$ that corresponds to a no load condition may be theoretically infinite. In many conventional half-bridge LLC resonant power converters, the power converter is still operated in a first normal mode under no load or very light load conditions. In some embodiments, LLC converters may be operated in a standby mode with burst phases during light load conditions.

In order to increase the understanding, FIGS. 6-13 described further specific embodiment implementations of the present invention in specific contexts. These embodiments, and the embodiments described hereinabove in reference to FIGS. 1-5, are not intended to be limiting, but instead convey some of the specific details envisioned by the inventors for embodiments in a specific contexts.

Figure 6:
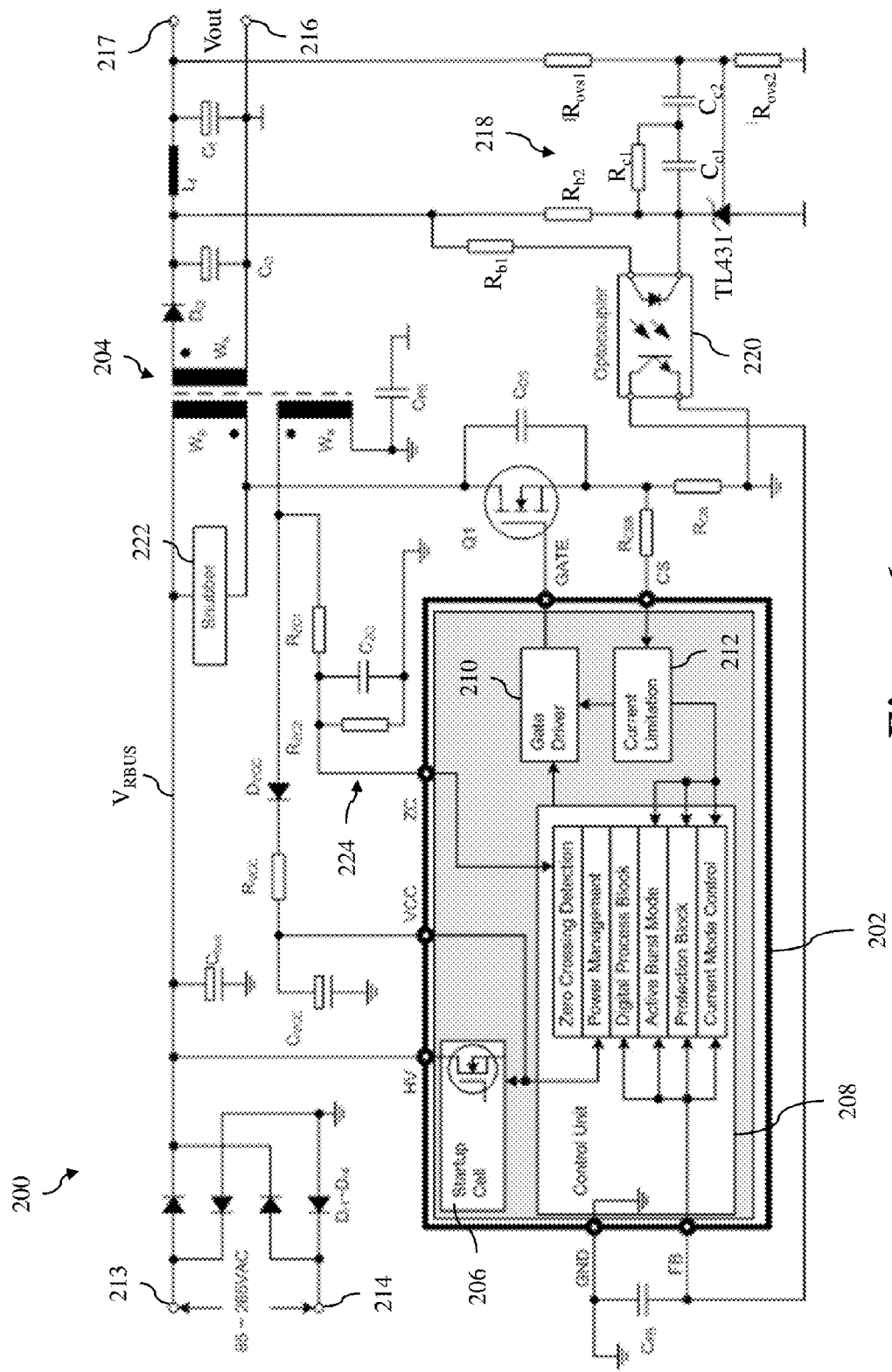
FIG. 6 illustrates a typical application circuit of a quasi-resonant flyback controller.

FIG. 6 illustrates an embodiment with a quasi-resonant flyback converter 200. The quasi-resonant flyback converter control scheme is well known in the art and will not be described further herein in the interest of brevity. In various embodiments, VCC capacitor $C_{VCC}$ operates in order to provide noise filtering and a power supply for controller IC 202 during an SMPS startup phase. As described hereinabove, VCC capacitor $C_{VCC}$ provides pre-charged energy stored in the capacitor to controller IC 202 before auxiliary winding Wa of transformer 204 of the quasi-resonant flyback converter is active and supplying the VCC voltage to controller IC 202. In order to provide noise filtering, VCC capacitor $C_{VCC}$ may have a capacitance of about 100 nF, for example. In order to provide a power supply before the quasi-resonant flyback converter is actively switching, VCC capacitor $C_{VCC}$ may have a capacitance value calculated as using the equation $$C_{VCC} \geq \frac{I_{Vccon} \cdot t_{start}}{V_{cc_{On}} - V_{cc_{off}}}, \qquad (1)$$

where $I_{vccon}$ is the IC current consumption during IC on state for controller IC 202, $V_{cc\_on}$ is the VCC voltage threshold for controller IC 202 to start normal operation, $V_{cc\_off}$ is the VCC voltage threshold for controller IC 202 to stop the normal operation, $t_{start}$ is the startup time duration before the auxiliary winding voltage (on auxiliary winding Wa) is built up to be above $V_{cc\_off}$. The capacitance value of VCC capacitor $C_{VCC}$ is commonly between 10 uF to 100 uF. Typically, a bulky aluminum capacitor may be used as a VCC capacitor in previous solutions. However, in various embodiments, VCC capacitor $C_{VCC}$ may be smaller due to the operation of startup cell 206 as described further hereinabove and further herein below.

VCC capacitor $C_{VCC}$ is one of the components which may limit the reduction of the form factor, such as for an adaptor or a phone charger application, due to the size. One advantage of some embodiments described herein includes reducing the capacitance, and thereby the physical size, of VCC capacitor $C_{VCC}$.

Compared to an analog controller IC, a digital controller IC often consumes more current $I_{vccon}$ because of CPU loading, which may result in a relatively bigger capacitance value for VCC capacitor $C_{VCC}$ to ensure stable startup operation of the SMPS system. Again, embodiments described herein may provide a system with a reduced capacitance for VCC capacitor $C_{VCC}$.

In various embodiments, quasi-resonant flyback converter 200 includes rectifier diodes Dr1, Dr2, Dr3, and Dr4 coupled to input terminals 213 and 214. Rectifier diodes Dr1, Dr2, Dr3, and Dr4 provide rectified bus voltage $V_{RBUS}$ to primary winding Wp of transformer 204 of the quasi-resonant flyback converter, which has snubber 222 coupled across the terminals of primary winding Wp. Bus capacitor $C_{BUS}$ is coupled to the bus with rectified bus voltage $V_{RBUS}$. Secondary winding Ws of transformer 204 is coupled to output diode $D_O$, output capacitor $C_O$, filtering inductor $L_f$, and filtering capacitor $C_f$ in order to supply output voltage $V_{out}$ to output terminals 216 and 217.

Feedback circuit 218 is coupled to a node between output diode $D_O$ and filtering inductor $L_f$ and is coupled to output terminal 217. Feedback circuit 218 supplies feedback information through optocoupler 220 to feedback pin FB of control unit 208 and includes resistor $R_{ovs1}$, resistor $R_{ovs2}$, resistor $R_{c1}$, resistor $R_{b1}$, resistor $R_{b2}$, capacitor $C_{c1}$, capacitor $C_{c2}$, and reference control IC TL431. Feedback capacitor $C_{FB}$ is coupled to from feedback pin FB to ground pin GND of controller IC 202.

Auxiliary winding Wa is coupled to ground with capacitor $C_{PS}$ coupled to the ground node. Switching transistor Q1 has a conduction path coupled from a second terminal of primary winding Wp to current sense resistor $R_{CS}$, which is coupled to ground. Switching transistor Q1 receives control signals at the control terminal of switching transistor Q1 from gate drive pin GATE of controller IC 202. Current sense pin CS of controller IC 202 receives current sense information through current sense branch resistor $R_{CSB}$ and current sense resistor $R_{CS}$.

Zero cross pin ZC of controller 202 is coupled to zero cross circuit 224, which includes resistor $R_{ZC1}$, resistor $R_{ZC2}$, and capacitor $C_{ZC}$. VCC supply pin VCC receives VCC voltage from the VCC supply circuit including VCC capacitor $C_{VCC}$, resistor $R_{VCC}$, and diode $D_{VCC}$, as described further hereinabove.

In various embodiments, controller IC 202 includes startup cell 206, control unit 208, gate driver 210, and current limitation circuit 212. In some embodiments, control unit 208 includes a zero crossing detection block, a power management block, a digital process block, an active burst mode block, a protection block, and a current mode control block.

Figure 7:
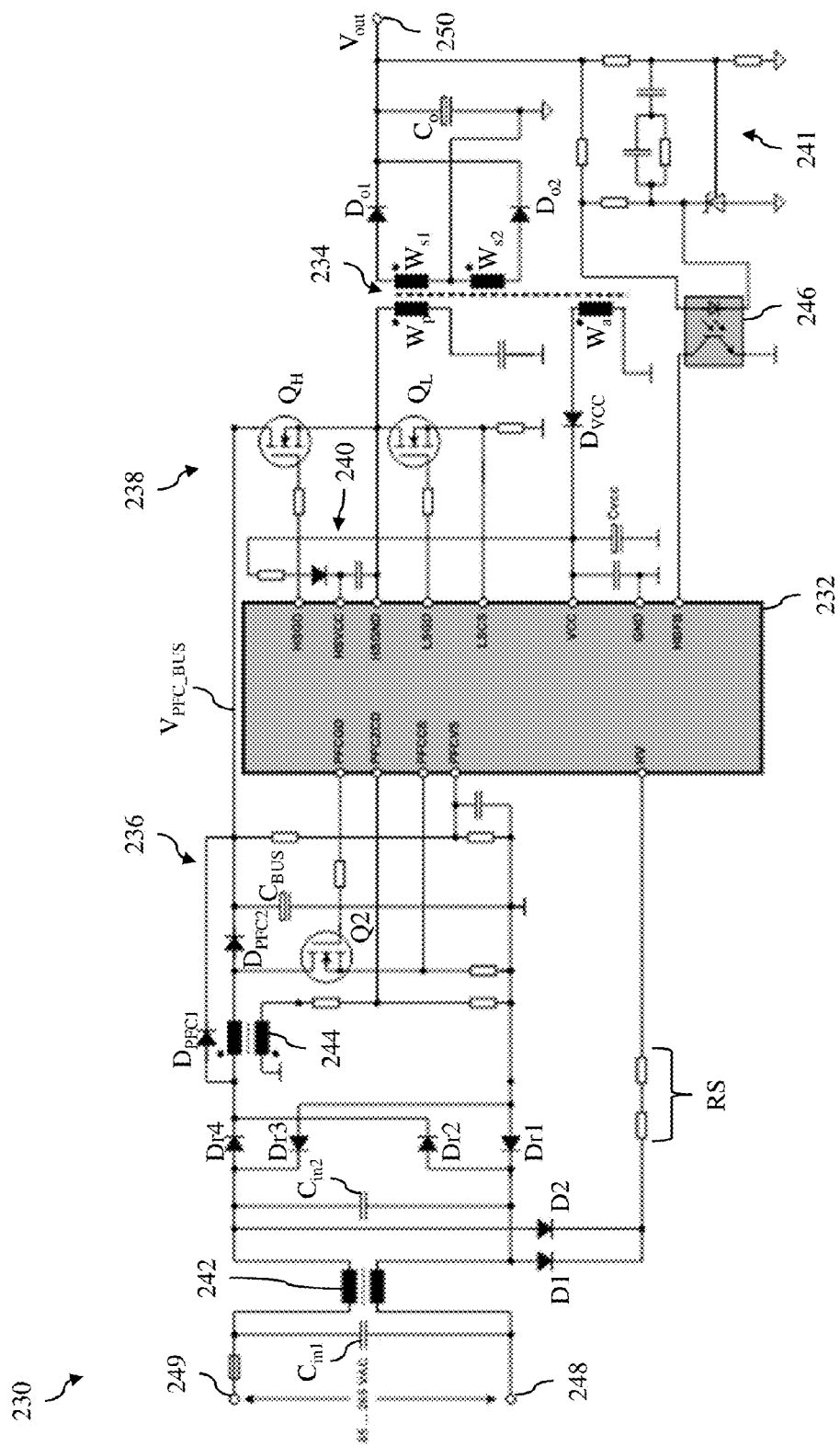
FIG. 7 illustrates an example application circuit of PFC+LLC converter.

As a further example, FIG. 7 illustrates an example application circuit of PFC+LLC converter 230. The control scheme for PFC+LLC converter 230 is well known in the art and will not be described further herein in the interest of brevity. When SMPS controller IC 232 is a dedicated combination IC to drive this PFC+LLC topology and VCC voltage of SMPS controller IC 232 is often supplied only by auxiliary winding Wa of LLC stage transformer 234, as shown in FIG. 7, then the startup time $t_{start}$, as defined in above equation (1), will be much longer, because PFC stage 236 will start switching before the downstream LLC stage 238 begins switching. PFC stage 236 begins switching in order to establish the PFC bus voltage $V_{PFC\_BUS}$, which is used as an input to LLC stage 238. Thus, the startup time may be extended by around 50~100 ms for a combination controller IC with PFC and LLC converters connected in series. Without applications of various embodiments described herein, an increased startup time may require a bigger capacitance value for the VCC capacitor $C_{VCC}$ in order to ensure stable startup operation of the PFC+LLC SMPS system.

In addition, there may be a separate LLC high side driver block with an isolated driving circuit such as a coreless transformer built inside or external to the IC. For some embodiments, during the IC startup phase, in addition to ensuring the VCC voltage is higher than $V_{cc\_off}$ such as 6 V for example, a VCC voltage higher than $V_{HSVCCon}$, such as 9.2 V nominal or 9.7 V maximum for example, may be ensured. The VCC voltage may be maintained above the $V_{HSVCCon}$ with a margin based on VCC capacitor $C_{VCC}$ tolerance and the voltage drop across bootstrap circuit 240 coupled to the HSVCC pin. If the VCC voltage drops below the high side driver threshold voltage $V_{HSVCCon}$, the LLC high side driver block may not be able to drive LLC high-side switch $Q_H$. As a result, power may not be delivered to supply and raise the VCC voltage through the auxiliary winding. Thus, the VCC voltage may keep dropping until the VCC off threshold $V_{cc\_off}$ is reached and SMPS controller IC 232 is reset. As described herein, various embodiments ensure the supply of the VCC voltage while allowing a smaller VCC capacitor $C_{VCC}$ to be used.

According to some embodiments, VCC capacitor $C_{VCC}$ may also be used during transitions from normal operation mode to burst mode. The charge stored on VCC capacitor $C_{VCC}$ may power the IC current consumption before the burst mode begins cycling and powering SMPS controller IC 232 through auxiliary winding Wa of LLC stage transformer 234. There may be a time period while output voltage $V_{out}$ is dropping to a standby target level and switching bursts are not active. Once output voltage $V_{out}$ reaches the standby target level, the burst switching may begin and SMPS controller IC 232 may receive power from auxiliary winding Wa of LLC stage transformer 234, as described hereinabove, but while output voltage $V_{out}$ is transitioning to the new operating level, the VCC voltage supplied to SMPS controller IC 232 may drop below the operation threshold, such as the $V_{HSVCCon}$ or the $V_{cc\_off}$ thresholds. During the transition time between normal operation and burst mode or standby operation, VCC capacitor $C_{VCC}$ may ensure the supply of the VCC voltage. During the transition from normal operation mode to burst operation mode, the VCC voltage may drop substantially and some embodiments described herein prevent such a substantial drop at the moment of entering burst mode, without increasing the capacitance and physical size of the VCC capacitor $C_{VCC}$.

LLC stage 238 includes LLC high-side switch $Q_H$, LLC low-side switch $Q_L$, LLC stage transformer 234 (with primary winding Wp, auxiliary winding Wa, and secondary windings Ws1 and Ws2), VCC capacitor $C_{VCC}$, and diode $D_{VCC}$. Feedback circuit 241 provides voltage feedback information through optocoupler 246 to SMPS controller IC 232. PFC stage 236 includes switch Q2, transformer 244, diodes $D_{PFC1}$ and $D_{PFC2}$, and bus capacitor $C_{BUS}$. In various embodiments, PFC+LLC converter 230 receives AC input voltage VAC, that may range from 85 V to 265 V, for example, at input terminals 248 and 249. AC input voltage VAC passes through input capacitors $C_{in1}$, and $C_{in2}$ and input filter 242 to rectifying diodes Dr1, Dr2, Dr3, Dr4, which supply a rectified input signal to PFC stage 236. Diodes D1 and D2 with series resistor RS supply input signal information to high voltage pin HV of SMPS controller IC 232.

Figure 8:
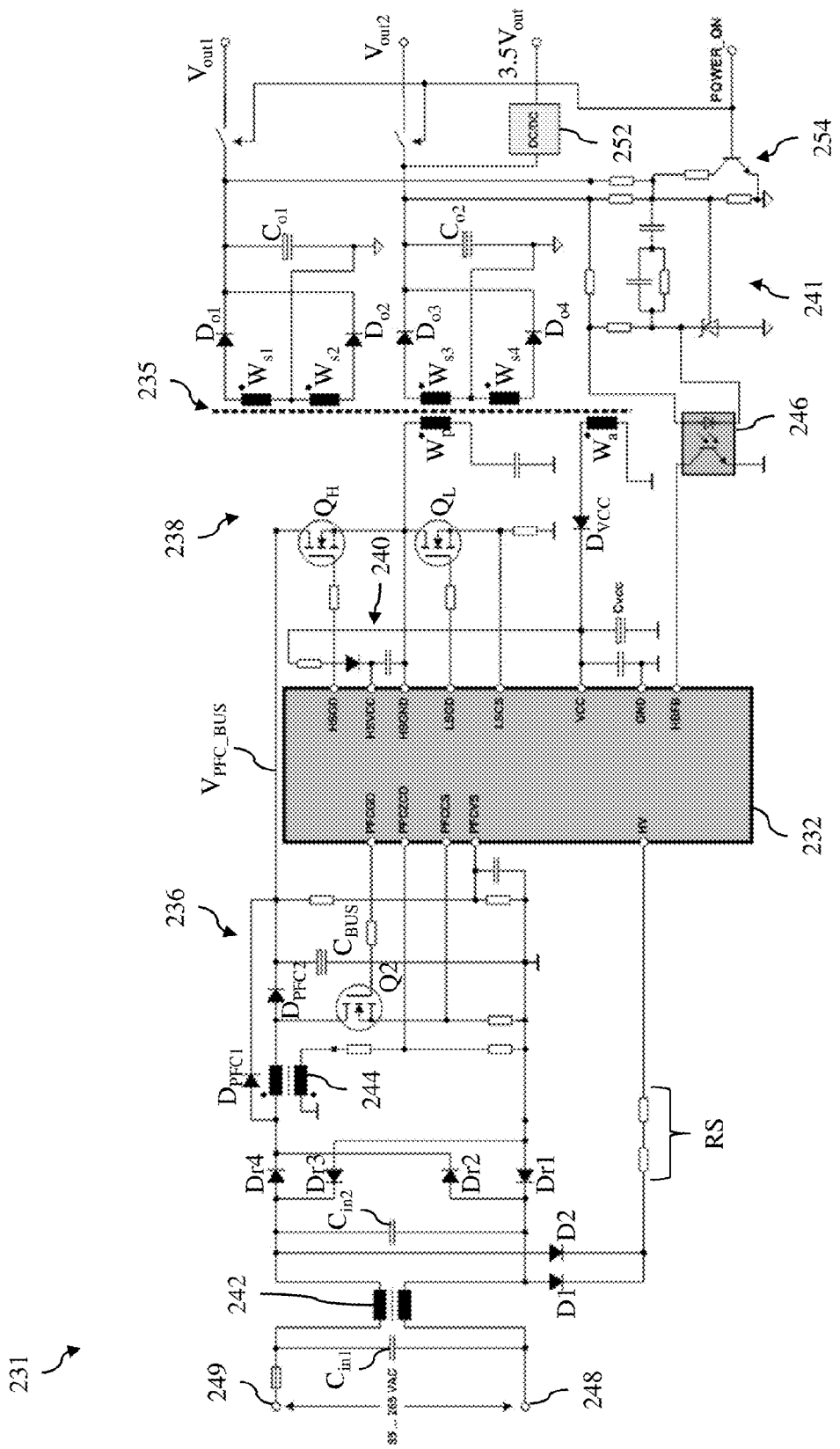
FIG. 8 illustrates an example application circuit for multiple output applications.

FIG. 8 illustrates an example application circuit for multiple output applications. The POWER_ON signal, supplied to power on circuit 254, is a dedicated signal to control PFC+LLC converter 231 entering or leaving standby mode. When the POWER_ON signal is pulled high, the PFC+LLC converter 231 will leave standby mode and enter normal operation mode. When the POWER_ON signal is pulled low (GND), the PFC+LLC converter 231 will enter standby operation mode and, subsequently, the Vout1 and Vout2 output loading will be cut off by the PMOS switches. Only the 3.5 V output is still under regulation by DC/DC converter 252 to supply the standby loading. During standby operation the input voltage for DC/DC converter 252 will be purposely reduced from original value used during normal operation to a relatively lower value, for example, about 80% of the original value. With this approach, a much lower LLC voltage transfer gain is required, compared to normal operation mode, in order to regulate the LLC output voltage. Thus, the LLC converter burst mode operation has a burst duty cycle that may be greatly reduced and, consequently, the standby mode power consumption can be further optimized. Further description is provided in reference to FIG. 9 below, which illustrates an operation timing sequence with the POWER_on signal. PFC+LLC converter 231 includes similar numbered elements as described hereinabove in reference to the other figures, such as PFC+LLC converter 230 in FIG. 7, for example, and the description provided hereinabove applies to commonly identified elements.

Figure 9:
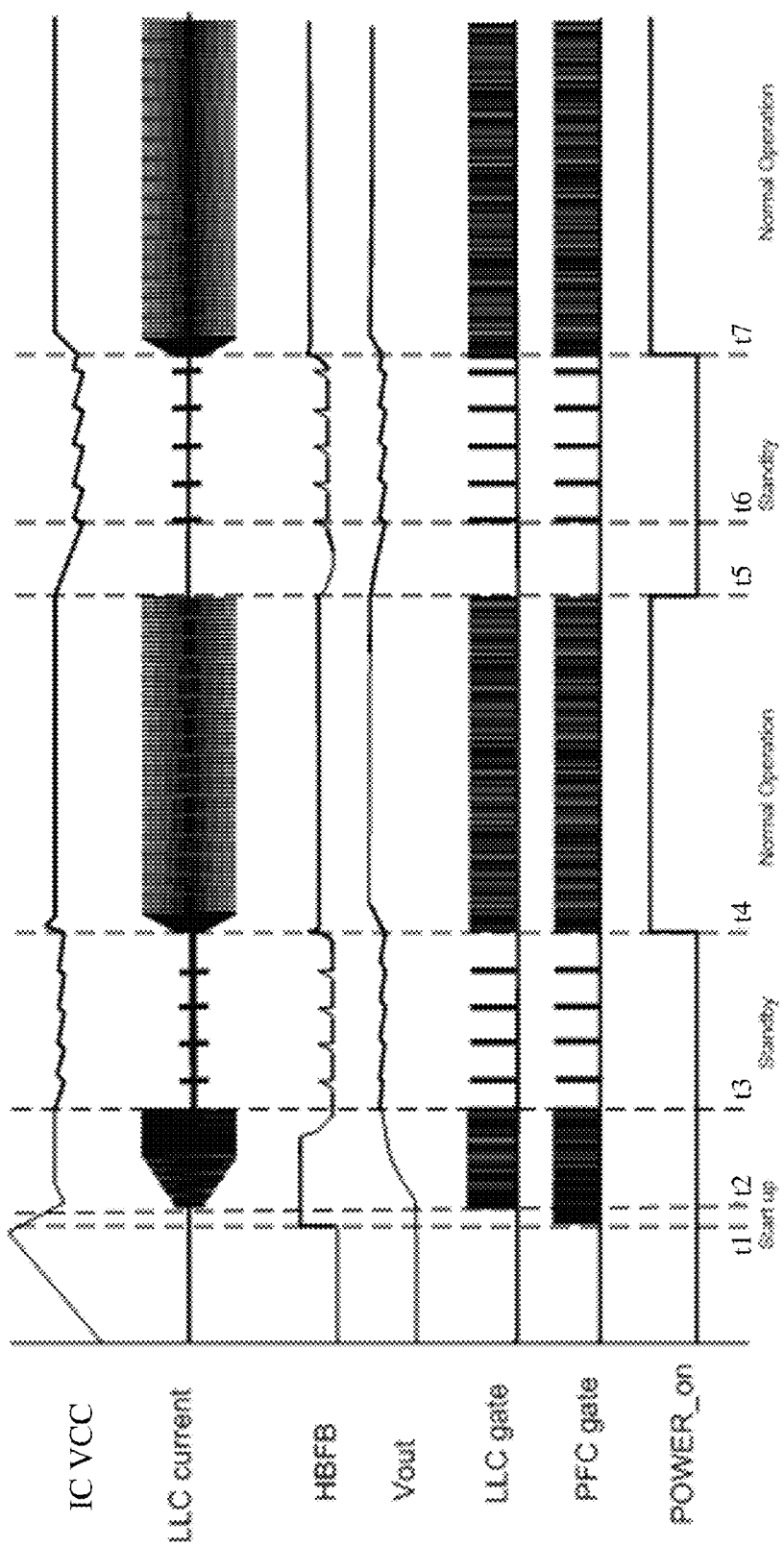
FIG. 9 illustrates an operation timing sequence with the POWER_on signal.

FIG. 9 illustrates an operation timing sequence with the POWER_on signal. As illustrated in FIG. 9, at time t5 when entering burst mode, there is a certain time period between time t5 and time t6 without any LLC switching. During this time period from time t5 to time t6 the input voltage of the DC/DC converter, such as DC/DC converter 252, is dropping until reaching the lower regulation target, such as 80% of the original Vout2 during normal operation for example, at time t6. The duration of the time frame between time t5 and time t6 depends on a value of an electrolytic capacitor coupled to Vout2, the 3.5 V Vout standby loading, and the power conversion efficiency of the DC/DC converter. During the time period between time t5 and time t6, the controller IC VCC voltage, such as controller IC 232, is also dropping as shown, and may reach the VCC under voltage lockout UVLO threshold or HSVCC on threshold $V_{HSVCCon}$. Thus, a relatively large VCC capacitor $C_{VCC}$ may be required to ensure a high enough VCC voltage during such as transition in some approaches. If the VCC voltage is not maintained above a minimum voltage, stable controller IC operation and the LLC high side gate driver activation may not be possible in some systems. Some embodiments described herein use an embodiment startup cell, such as described hereinabove in reference to startup cell 124 in FIGS. 2 and 3, for example, to ensure that the VCC voltage is maintained above the minimum operation threshold during startup and transitions into burst mode while decreasing the required capacitance and physical size of VCC capacitor $C_{VCC}$.

Some approaches have included a large capacitor in order to ensure that the VCC voltage is maintained above the minimum operation threshold. For example, to ensure stable startup, the controller IC VCC capacitor capacitance selection may follow equation (1) above. Some approaches to reducing the required capacitance are described further below.

One approach to reducing the capacitance of the VCC capacitor is to reduce the controller IC current consumption $I_{vccon}$. However, this approach is limited by the IC process technology and the complexity of the controller IC. Another approach to reducing the capacitance of the VCC capacitor is to purposely shorten the startup time $t_{start}$. The startup time may be shortened by increasing the number of turns of the transformer auxiliary winding, such as auxiliary winding Wa of transformer 204 in FIG. 6, for example. However, increasing the number of turns will increase the VCC voltage to a higher value when the SMPS reaches the normal operation mode. Thus, increasing the number of turns in the auxiliary winding may require an additional voltage clamping circuit in order to avoid IC VCC overstress during normal operation.

Another approach to reducing the capacitance of the VCC capacitor may include increasing the SMPS peak power. However, increased peak power may require a bigger transformer and also may produce higher current stress for the other power devices in the system, such as the primary MOSFET and the secondary rectifier diode/MOSFET, for example. Still another approach to reducing the capacitance of the VCC capacitor may include increasing the gap between Vcc_on and Vcc_off thresholds. However, the Vcc_on threshold is limited by the IC process technology, which defines the maximum voltage that the controller IC can handle. Further, the Vcc_off threshold is limited by the minimum gate driving voltage to ensure the switching MOSFETs can be fully switched on and operate in $R_{dson}$ region.

For the transition from normal operation to standby or burst mode, to ensure stable operation during the transition, the capacitance of the controller IC VCC capacitor may be given by the equation $$C_{VCC} \geq \frac{I_{Vcc\_burst} \cdot T_{enter\_burst}}{V_{cc\_t\_enter\_burst} - V_{HSVCCon}}, \quad (2)$$

where $I_{vcc\_burst}$ is the IC current consumption during IC burst mode, $V_{cc\_t\_enter\_burst}$ is the VCC voltage at time t5 when entering burst mode, $V_{HSVCCon}$ is the VCC voltage threshold for the IC high side gate driver voltage to start operation, $T_{enter\_burst}$ is the length of the time period during which voltage Vout2 is dropping from nominal voltage to a lower voltage, e.g., from 12V to 8V. The length of the time period during which voltage Vout2 is dropping from the nominal voltage to the lower voltage may be estimated by the equation $$T_{enter\_burst} = \frac{C_{Vout3} \cdot (12\ V * 12\ V - 8\ V * 8\ V)}{2 * P_{standby}}, \quad (3)$$

where $C_{Vout3}$ is the capacitance of the Vout3 capacitor, which is mounted at the input of the 3.5 V DC/DC converter, such as three pieces of 470 μF e-Cap connected in-parallel for example, and $P_{standby}$ is the input power of the DC/DC converter during standby mode. A typical value for $P_{standby}$ may be around 50 mW÷90%, or 56 mW, for example. Thus, a typical value for $T_{enter\_burst}$ may be calculated as $$T_{enter\_burst} \frac{3 * 470 uF \cdot (12\ V * 12\ V - 8\ V * 8\ V)}{2 * 56\ mW} = 1007\ ms$$

And, accordingly, the minimum capacitance of the VCC capacitor may be calculated as $$C_{VCC} > \frac{I_{Vcc\_burst} \cdot T_{enter\_burst}}{V_{cc\_t\_enter\_burst} - V_{HSVCCon}} = \frac{1.2\ mA \cdot 1007\ ms}{12\ V - 10\ V} = 604\ \mu F$$

where $V_{cc\_t\_enter\_burst}$ is set as 12V, which is a typical VCC value for an LLC converter under a light load condition. Based on this approach, a large capacitance of 604 μF for the VCC capacitor may be required.

According to various embodiments, a startup cell, as described hereinabove in reference to startup cell 124 in FIGS. 2 and 3 or startup cell 206 in FIG. 6, for example, may be used, along with embodiment methods of operation, to reduce the capacitance of the VCC capacitor $C_{VCC}$ while ensuring that the VCC voltage does not drop below a minimum operation threshold during startup or transitions between normal operation and standby operation, for example.

A startup cell circuit may be used in an SMPS application to ensure fast startup and also low power consumption during normal operation and standby operation. According to one approach, a control scheme of startup cell is such that the startup cell is in the on state only when the VCC voltage is below $V_{cc\_off}$ and in the off state when the VCC voltage is above $V_{cc\_on}$. As a consequence, for some approaches a startup cell is only used to charge up the VCC voltage during startup phase and to maintain the VCC voltage during a protection mode. This protection mode includes automatic restart or latch off protection if a fault condition is detected. In an embodiment, during this fault detection mode, the startup cell, such as startup cell 124 or startup cell 206, is activated to maintain the VCC voltage to keep the IC operational when there is no LLC or PWM switching.

Figure 10:
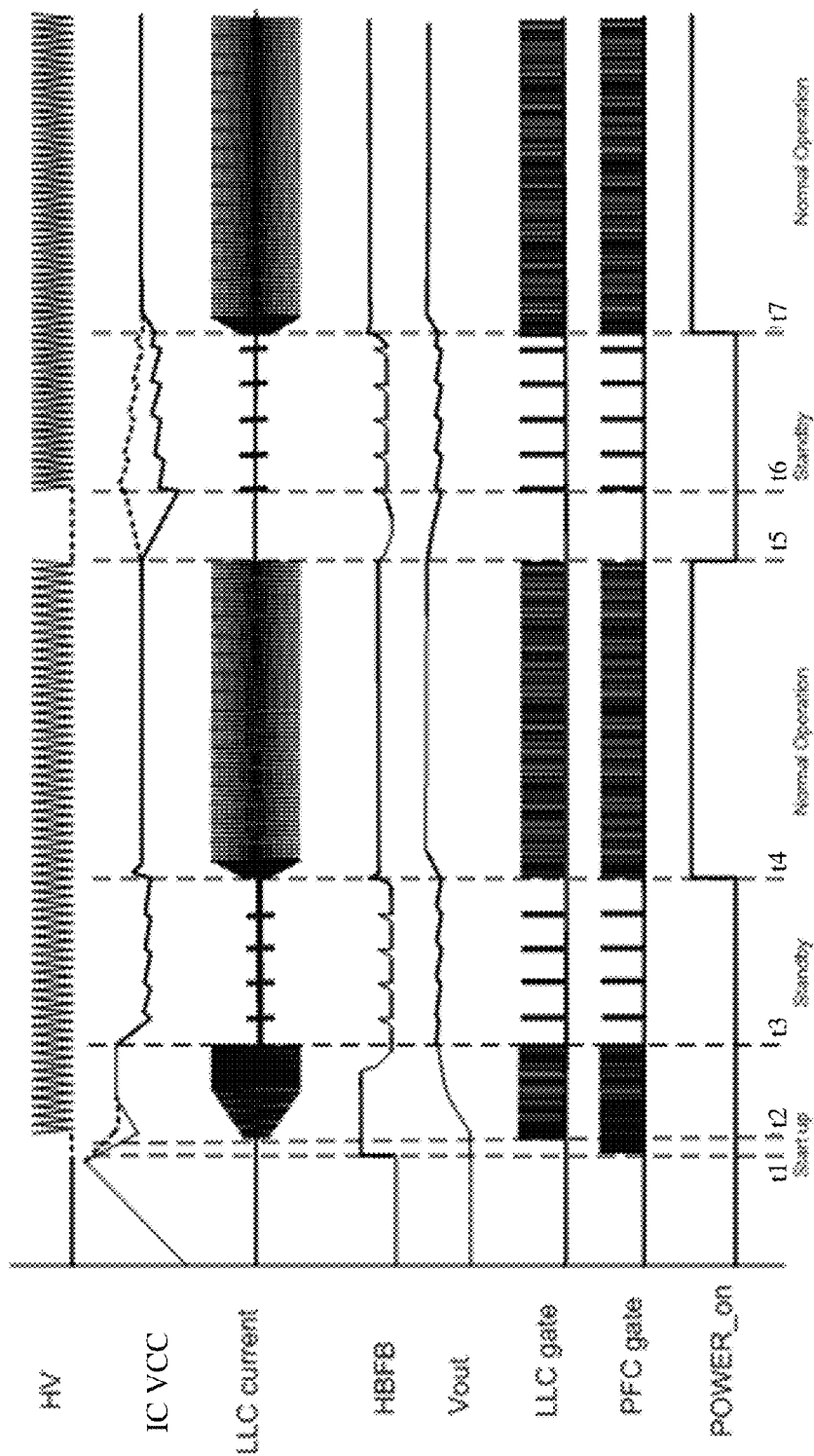
FIG. 10 illustrates operation of an embodiment startup cell for the VCC capacitor.

FIG. 10 illustrates operation of an embodiment startup cell, such as startup cell 124 in FIGS. 2 and 3 or startup cell 206 in FIG. 6, for example, for the VCC capacitor that allows a reduced capacitance to be used. As shown in FIG. 10 with the dashed line, during a system startup phase, the IC startup cell is maintained in the on state in the beginning and, consequently, the VCC voltage is maintained through the startup phase. In various embodiments, when the VCC voltage reaches Vcc_on state, the controller IC starts the normal operation and the IC current consumption is also increasing to $I_{vccon}$. Instead of switching-off the startup cell at the moment when the VCC voltage equals the $V_{cc\_on}$ voltage threshold, as is done for some approaches in an SMPS IC with a startup cell, the startup cell remains in the on state with certain delay time $t_{cell\_delay}$. With this modification, the equation for the capacitance of the VCC capacitor becomes $$C_{VCC} \geq \frac{(I_{Vccon} - I_{cell}) \cdot t_{start}}{V_{cc\_on} - V_{cc\_off}}, \quad (4)$$

where $L_{cell}$ is the current delivered by the startup cell at the on state. If $L_{cell}$ is above or equal to $I_{vccon}$, theoretically the function for charge storage on VCC capacitor $C_{VCC}$ may not be necessary. As such, the VCC capacitor $C_{VCC}$ may be used for noise filtering, which may require only 100 nF of capacitance, for example.

Figure 11:
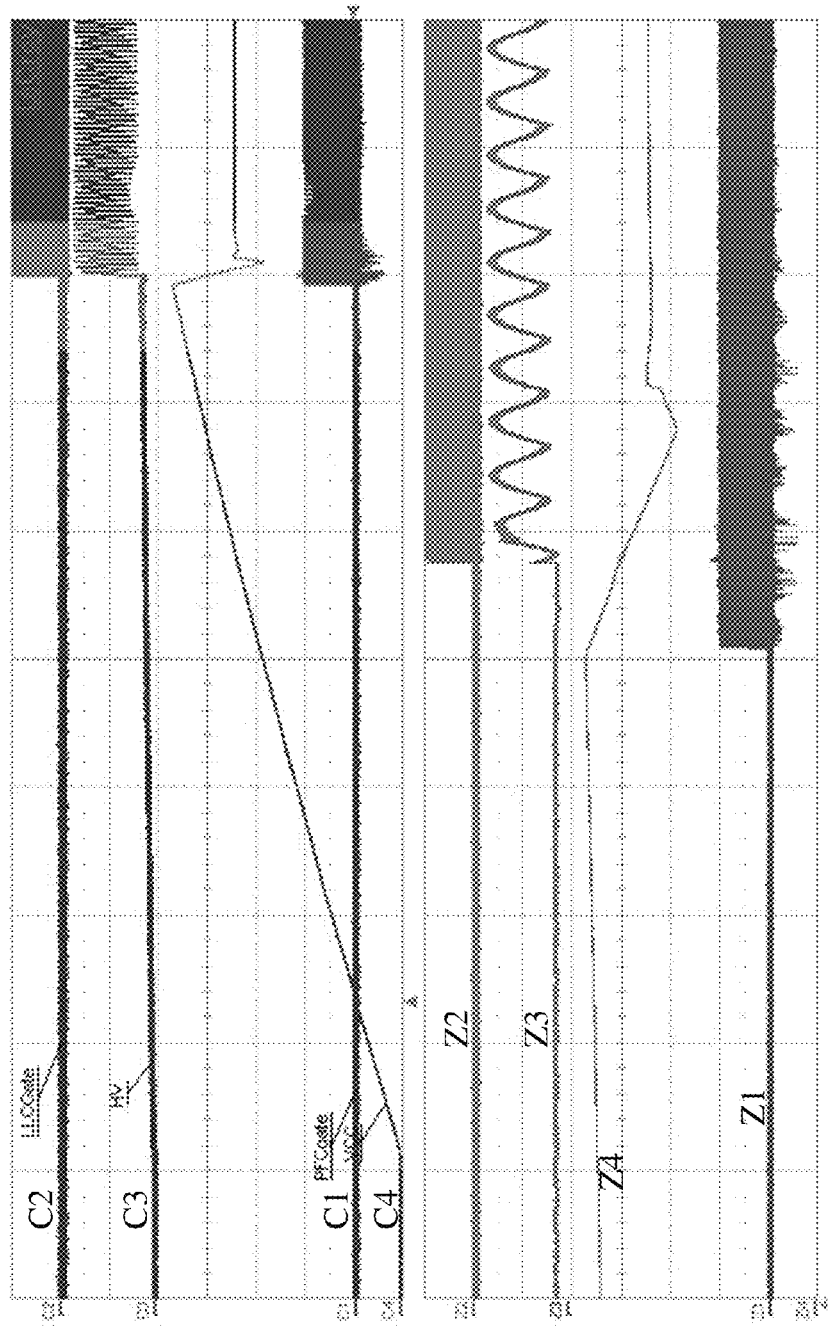
FIG. 11 illustrates a waveform diagram of an embodiment startup cell operation during the startup phase.

FIG. 11 illustrates a waveform diagram of an embodiment startup cell operation, such as for startup cell 124 in FIGS. 2 and 3 or startup cell 206 in FIG. 6, for example, during the startup phase and illustrates the proposed control scheme for the startup cell. Channel C1 indicates the PFC gate driver voltage, channel C2 indicates the LLC gate driver voltage, channel C3 indicates the HV pin voltage, and channel C4 indicates the IC VCC voltage. During the whole startup phase, the startup cell is activated to charge up the VCC capacitor $C_{VCC}$. As a result, the observed HV pin voltage maintains at low level indicating that the startup cell is conducting the rectified power input to the VCC capacitor $C_{VCC}$. When the VCC voltage reaches the Vcc_on threshold, the controller IC is activated and begins driving the PFC switching signal. At the same time, in various embodiments, the startup cell is still activated to continue charging the VCC capacitor $C_{VCC}$. Thus, the VCC voltage drop or slew rate is reduced compared to other approaches. Accordingly, the risk of the VCC voltage reaching the under voltage lockout threshold UVLO or the minimum high side voltage drive threshold $V_{HSVCCon}$ can be reduced.

As shown, when the PFC bus voltage is established by PFC switching, LLC starts switching and starts to supply the VCC voltage. This is more easily shown by the zoom views Z1, Z2, Z3, and Z4 corresponding to channels C1, C2, C3, and C4, respectively. As shown, in the startup phase, the PFCGate signal shown by zoom view Z1 begins switching first and the PFC bus is charged. After a time delay caused by charging the PFC bus, the LLCGate signal shown by zoom view Z2 begins driving the LLC converter. During the time when the LLCGate signal is not actively switching, the startup cell is in the on state, conducting the power input to the VCC capacitor $C_{VCC}$. This embodiment control scheme prevents the VCC voltage from dropping too quickly.

When the LLC converter is actively switching, the startup cell is disabled as shown by zoom view Z3 beginning to alternate, which corresponds to the HV pin being decoupled from the VCC capacitor $C_{VCC}$ and becoming a floating connection. As shown in the FIG. 11 waveform, the HV voltage in channel C3 or zoom view Z3 jumps, indicating that the startup cell is disabled. When the startup cell is disabled, the LLC converter supplies the VCC voltage via the LLC transformer auxiliary winding.

Some embodiment startup cells are also operated during transitions from normal operation to standby operation. As shown in FIG. 10 with the dashed line at the HV pin voltage and the VCC pin voltage, at the transition from normal operation to standby or burst mode operation beginning at time t5, the controller IC startup cell is activated in the on state and, consequently, the VCC voltage is charged until time t6. Thus, the stable transition during the time period between time t5 and time t6 can be ensured.

In various embodiments, during the transition period between time t5 and time t6, the controller IC monitors the VCC voltage and, if the VCC voltage reaches the Vcc_max threshold, the startup cell is turned off. When the first LLC burst switching pulse occurs at time t6, the controller IC startup cell is disabled and, subsequently, during the remainder of the standby or burst mode operation, the controller IC VCC voltage is supplied by the burst switching of the LLC converter. In such embodiments, the standby power consumption is not affected by the startup cell because the startup cell is deactivated.

Figure 12:
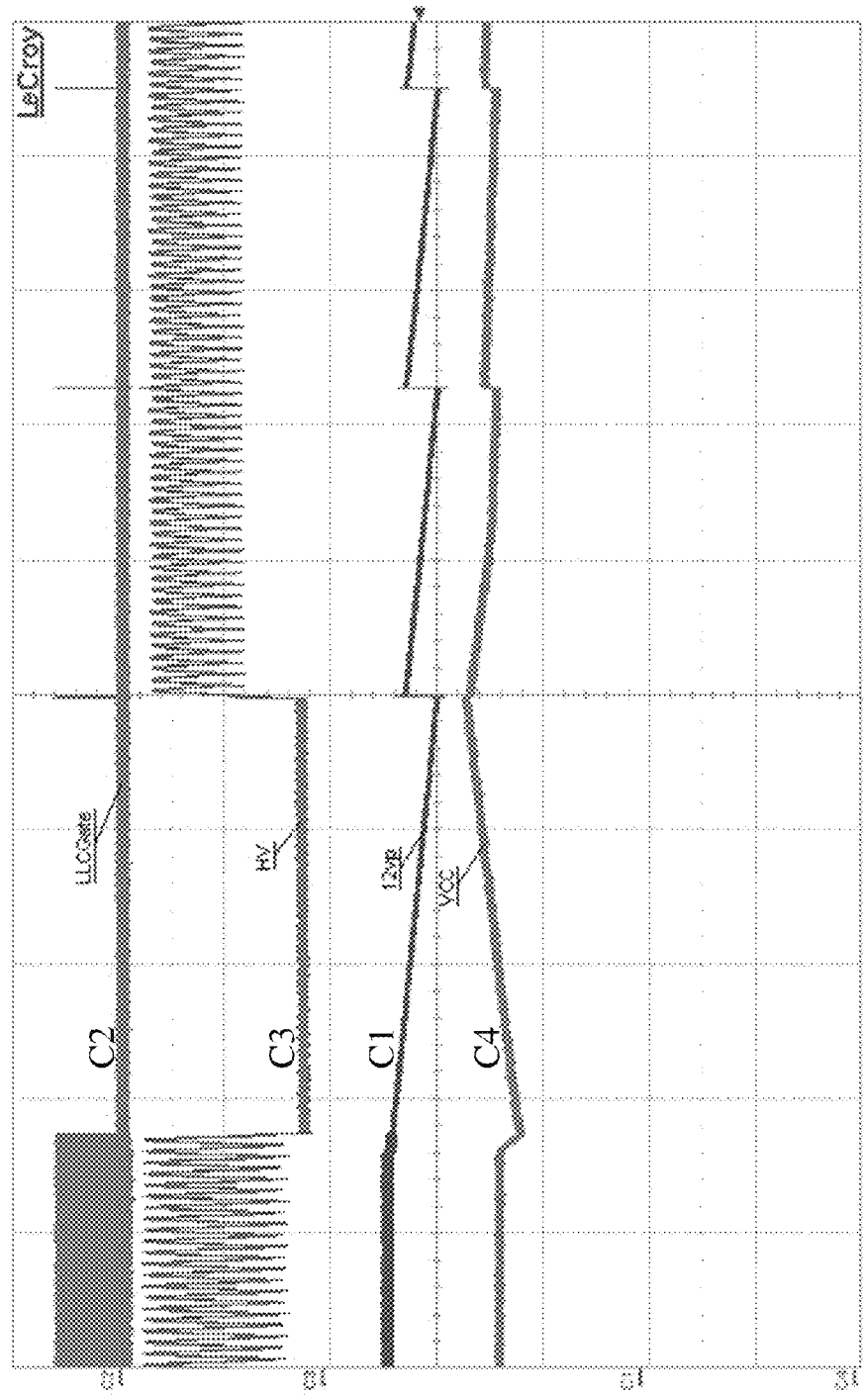
FIG. 12 illustrates a waveform diagram of the startup cell operation when entering standby or burst mode operation.

In order to further understand the transition from normal operation to standby operation for the startup cell, such as for startup cell 124 in FIGS. 2 and 3 or startup cell 206 in FIG. 6, for example, FIG. 12 illustrates a waveform diagram of the startup cell operation when entering standby or burst mode operation. As shown in FIG. 12, channel C1 indicates the LLC output voltage Vout2 (which is transitioning from a 12 V target level to an 8 V target level during the transition to standby operation, for example), channel C2 indicates the LLC gate driver voltage, channel C3 indicates the HV pin voltage, and channel C4 indicates the IC VCC voltage. It is possible that the transition phase for entering burst mode or standby operation may have an extended duration as the LLC output regulation target voltage may differ significantly from the normal operation mode target voltage.

During this transition phase, if the VCC voltage is not maintained, the VCC voltage decreases and may reach the VCC UVLO threshold where the controller IC is reset, for example. Resetting the controller IC during operation is particularly undesirable when the reset is unintended. As another example, during the transition phase, if the VCC voltage decreases below the $V_{HSVCCon}$ threshold, the controller IC high side gate driver may be unable to drive switching of the high side switch for a following switching burst. Accordingly, if the high side switch is not driven during the switching burst, no power is delivered to supply the standby loading and the controller IC VCC voltage is not supplied, which results in the VCC voltage reaching the Vcc_off threshold and the controller IC being reset.

In various embodiments, the startup cell is activated during this transition phase, which maintains the VCC voltage and even charges the VCC voltage as shown by channel C4 in FIG. 12. Thus, embodiments may exhibit very robust operation for entering burst mode or standby operation. As shown in FIG. 12, the HV pin voltage is pulled down during the transition to standby or burst mode operation, which indicates that the startup cell is activated to charge the VCC capacitor $C_{VCC}$.

In various embodiments, the startup cell may include any kind of switching element, such as a MOSFET or other transistor. In a particular embodiment, the startup cell is a depletion MOSFET. The startup cell may be controlled by the controller IC, such as controller IC 116 as described hereinabove in reference to FIGS. 2 and 3 or controller IC 202 as described hereinabove in reference to FIG. 6, for example, and may be integrated within the controller IC. The conduction path of the startup cell, when controlled to enter the conducting state, may couple the HV pin, which receives the rectified input power, to the VCC capacitor $C_{VCC}$. For example, FIG. 6 illustrates one embodiment configuration of the startup cell integrated within a controller IC.

According to some embodiments, a startup cell is operated during startup or transition periods such that the capacitance of the VCC capacitor for a combination IC may be reduced. For example, a controller IC for series connected PFC and LLC converters may receive a VCC supply voltage that is stabilized by a VCC capacitor. In various embodiments, the startup cell continues conducting during the PFC+LLC startup phase until the LLC converter begins switching. As long as the startup cell is conducting, the rectified input power supplies the controller IC VCC capacitor $C_{VCC}$ through the startup cell. Thus, the capacitance of the VCC capacitor $C_{VCC}$ may be reduced due to the extended duration of supply through the startup cell. According to some approaches, the startup cell is only used to charge up the VCC during the startup phase until the VCC voltage reaches the Vcc_on threshold. In such approaches, a large VCC capacitance is often used to ensure the VCC voltage is maintained above the HSVCCon threshold and the VCC_off threshold until the LLC starts switching. As a consequence of these approaches, the large VCC capacitance may increase the controller IC startup time. Embodiments described herein provide a smaller VCC capacitor in operation with a startup cell that prevents the VCC voltage from unintentionally dropping below a minimum operation voltage.

In various embodiments, the startup cell is enabled during the transition phase for entering burst mode. The transition phase between normal operation and standby or burst mode operation may last for an extended time period because the LLC output regulation target voltage may differ between normal operation mode and standby operation mode. During this transition period, the VCC voltage may decrease below a minimum operation voltage threshold, causing undesirable operation and resetting of the controller IC. According to various embodiments, the startup cell is activated during these transition phases and the VCC capacitor is supplied with the rectified input power in order to maintain or charge the VCC voltage during the transition from normal operation to standby or burst mode operation. Thus, embodiments described herein may exhibit robust operation for entering the burst mode.

Figure 13:
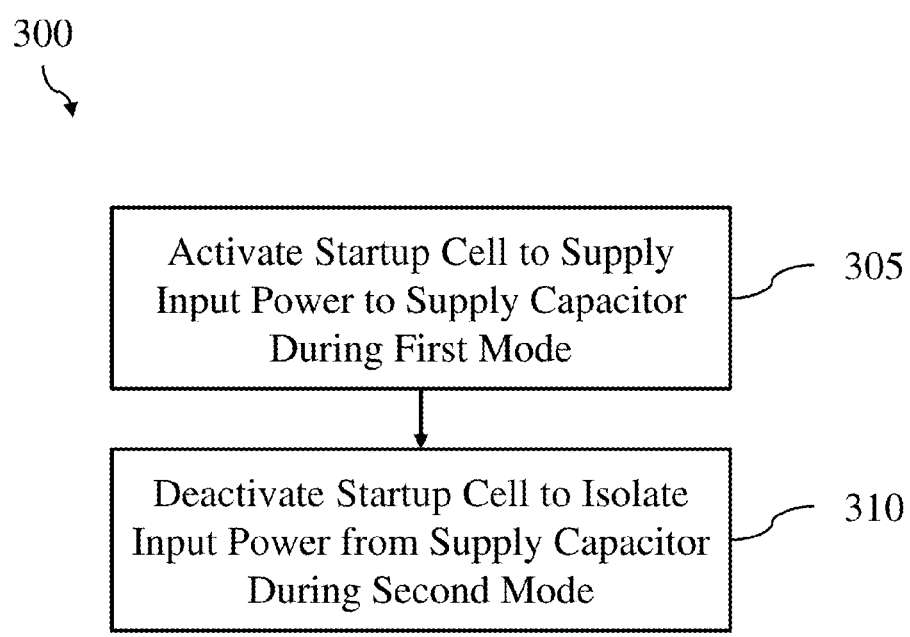
FIG. 13 illustrates an embodiment method of operation for a startup cell and controller IC.

FIG. 13 illustrates an embodiment method of operation for a startup cell and controller IC. The method of operation 300 includes steps 305 and 310. In various embodiments, method of operation 300 is a method of operating a switching circuit including a first switching circuit, such as a PFC converter, a second switching circuit, such as a resonant converter, coupled to an output of the first switching circuit, and a supply capacitor. Step 305 includes activating a startup cell to supply input power to the supply capacitor during a first mode. The first mode may be when the second switching circuit is inactive, such as, for example, during a startup phase or a transition phase between normal and standby operation modes. Step 310 includes deactivating the startup cell to isolate input power from the supply capacitor during a second mode. The second mode may be when the second switching circuit is active, such as during normal operation of the switching circuit, for example.

According to an embodiment, a circuit includes a first switching circuit coupled to a power supply input, a second switching circuit coupled to an output of the first switching circuit, a supply capacitor coupled to the second switching circuit, and a startup cell coupled to the power supply input and the supply capacitor. The startup cell is configured to electrically couple the power supply input to the supply capacitor when the second switching circuit is not actively switching and electrically decouple the power supply input from the supply capacitor when the second switching circuit is actively switching. Other embodiments include corresponding systems and apparatus, each configured to perform various embodiment methods.

In various embodiments, the second switching circuit includes a transformer including a primary side winding, an auxiliary winding, and a secondary side winding. The auxiliary winding may be coupled to the supply capacitor. In some embodiments, the first switching circuit is a power factor correction converter and the second switching circuit is a resonant converter or a pulse width modulation (PWM) converter. In such embodiments, the resonant converter may include an LLC converter circuit.

In various embodiments, the circuit further includes a rectifier coupled between the power supply input and the startup cell, where the power supply input is configured to receive an alternating current signal. In some embodiments, the startup cell includes a transistor having a conduction path that couples the power supply input to the supply capacitor.

According to an embodiment, a converter system includes a controller including a startup cell. The controller is configured to be coupled to a first switching circuit, a second switching circuit coupled to an output of the first switching circuit, and a supply capacitor. The controller is also configured to activate the startup cell to supply input power to the supply capacitor when the second switching circuit is inactive and deactivate the startup cell to isolate input power from the supply capacitor when the second switching circuit is active. Other embodiments include corresponding systems and apparatus, each configured to perform various embodiment methods.

In various embodiments, the converter system further includes the first switching circuit and the second switching circuit. In such embodiments, the first switching circuit includes a power factor correction converter and the second switching circuit includes an LLC resonant converter. In some embodiments, the converter system further includes the second switching circuit. In such embodiments, the second switching circuit may include one of an LLC resonant converter, a flyback converter, and a forward converter.

In various embodiments, the converter system includes a PWM converter with active clamping. In such embodiments, the PWM converter with active clamping may include at least one of an active clamping flyback converter and an active clamping forward converter. In some embodiments, the converter system further includes the second switching circuit and the supply capacitor. In such embodiments, the second switching circuit includes a transformer including a primary side winding, an auxiliary winding, and a secondary side winding. In additional embodiments, the auxiliary winding is coupled to the supply capacitor.

According to an embodiment, a switching circuit includes a first switching circuit, a second switching circuit coupled to an output of the first switching circuit, and a supply capacitor. A method of operating the switching circuit includes activating a startup cell to supply input power to the supply capacitor during a first mode and deactivating the startup cell to isolate input power from the supply capacitor during a second mode. The first mode includes when the second switching circuit is inactive and the second mode includes when the second switching circuit is active. Other embodiments include corresponding systems and apparatus, each configured to perform various embodiment methods.

In various embodiments, the first mode includes a startup mode for the switching circuit. In some embodiments, the first mode includes a standby mode for the switching circuit. In additional embodiments, activating the startup cell includes driving a startup transistor in a conducting state and deactivating the startup cell includes driving the startup transistor in a non-conducting state. In such embodiments, the startup transistor has a conduction path that couples the supply capacitor to a power supply input.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A circuit comprising:
   a first switching circuit coupled to a power supply input;
   a second switching circuit coupled to an output of the first switching circuit;
   a supply capacitor coupled to the second switching circuit; and
   a startup cell coupled to the power supply input and the supply capacitor, wherein the startup cell is configured to
   electrically couple the power supply input to the supply capacitor when the second switching circuit is not actively switching, and
   electrically decouple the power supply input from the supply capacitor when the second switching circuit is actively switching.

2. The circuit of claim 1, wherein the second switching circuit comprises a transformer comprising a primary side winding, an auxiliary winding, and a secondary side winding.

3. The circuit of claim 2, wherein the auxiliary winding is coupled to the supply capacitor.

4. The circuit of claim 1, wherein the first switching circuit is a power factor correction converter and the second switching circuit is a resonant converter or a pulse width modulation (PWM) converter.

5. The circuit of claim 4, wherein the resonant converter comprises an inductor-inductor-capacitor (LLC) converter circuit.

6. The circuit of claim 1, further comprising a rectifier coupled between the power supply input and the startup cell, wherein the power supply input is configured to receive an alternating current signal.

7. The circuit of claim 1, wherein the startup cell comprises a transistor having a conduction path that couples the power supply input to the supply capacitor.

8. A converter system comprising:
   a controller comprising a startup cell and configured to be coupled to a first switching circuit, a second switching circuit coupled to an output of the first switching circuit, and a supply capacitor, wherein the controller is configured to:
   activate the startup cell to supply input power to the supply capacitor when the second switching circuit is inactive; and
   deactivate the startup cell to isolate input power from the supply capacitor when the second switching circuit is active.

9. The converter system of claim 8, further comprising the first switching circuit and the second switching circuit, the first switching circuit comprising a power factor correction converter and the second switching circuit comprising an inductor-inductor-capacitor (LLC) resonant converter.

10. The converter system of claim 8, further comprising the second switching circuit, wherein the second switching circuit comprises one of an inductor-inductor-capacitor (LLC) resonant converter, a flyback converter, and a forward converter.

11. The converter system of claim 8, wherein the converter system comprises a PWM converter having active clamping.

12. The converter system of claim 11, wherein the PWM converter comprising active clamping comprises at least one of an active clamping flyback converter and an active clamping forward converter.

13. The converter system of claim 8, further comprising the second switching circuit and the supply capacitor, wherein the second switching circuit comprises a transformer comprising a primary side winding, an auxiliary winding, and a secondary side winding.

14. The converter system of claim 13, wherein the auxiliary winding is coupled to the supply capacitor.

15. A method of operating a switching circuit comprising a first switching circuit, a second switching circuit coupled to an output of the first switching circuit, and a supply capacitor, the method comprising:

activating a startup cell to supply input power to the supply capacitor during a first mode; and deactivating the startup cell to isolate input power from the supply capacitor during a second mode, wherein
the first mode comprises when the second switching circuit is inactive, and
the second mode comprises when the second switching circuit is active.

16. The method of claim 15, wherein the first mode comprises a startup mode for the switching circuit.

17. The method of claim 15, wherein the first mode comprises a standby mode for the switching circuit.

18. The method of claim 15, wherein:

activating the startup cell comprises driving a startup transistor in a conducting state, wherein the startup transistor has a conduction path that couples the supply capacitor to a power supply input, and deactivating the startup cell comprises driving the startup transistor in a non-conducting state.

* * * * *